United States Patent [19]

Smith

[11] Patent Number: 4,936,290
[45] Date of Patent: Jun. 26, 1990

[54] SOLAR ENERGY SYSTEM

[76] Inventor: Raymond H. Smith, Rte. 2, 5AAA, Larned, Kans. 67550

[21] Appl. No.: 399,913

[22] Filed: Aug. 29, 1989

[51] Int. Cl.⁵ .................................................. F24J 2/34
[52] U.S. Cl. .................................... 126/436; 126/437; 126/438; 126/450
[58] Field of Search ................. 126/436, 437, 438, 450

[56] References Cited

U.S. PATENT DOCUMENTS 2,167,576  7/1939  Kiser ...................................... 126/437
3,946,720  3/1976  Keyes et al. ........................... 126/436

Primary Examiner—Carroll B. Dority
Attorney, Agent, or Firm—Litman, McMahon & Brown

[57] ABSTRACT

A solar energy system includes fluidically innerconnected lower and upper collectors. The lower collector includes inner and outer cabinets with an interstitial space therebetween adapted to receive compost or a similar material for providing insulation, thermal storage mass and heat generation through decomposition. The upper collector includes a vessel assembly with water compartments and a reflector assembly for irradiating the vessel assembly with indirect solar insolation. The upper collector also includes thermal storage mass. Heated air from the lower collector inner cabinet is drawn or pumped into the upper collector for increasing the heat output of the latter.

12 Claims, 4 Drawing Sheets

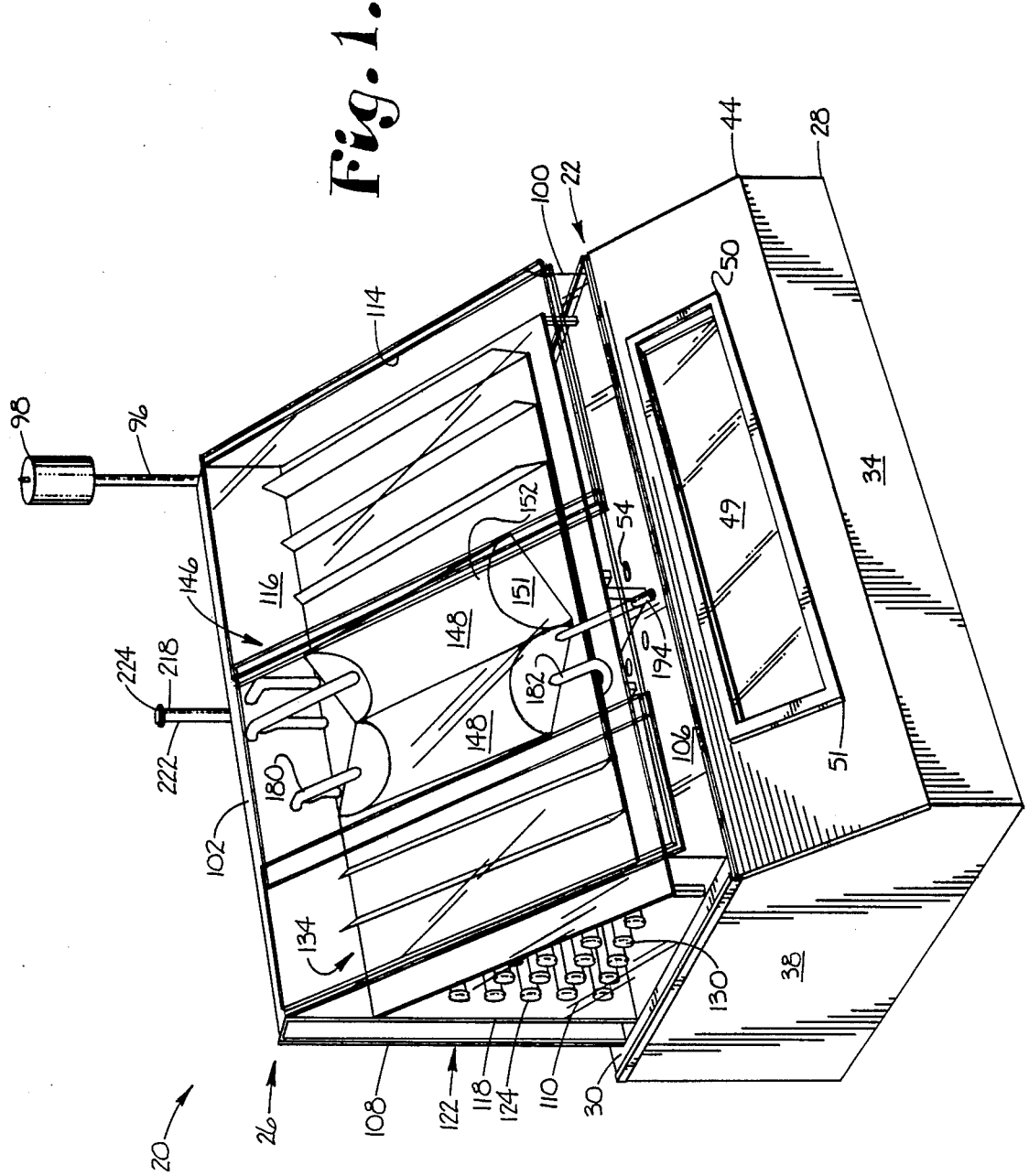

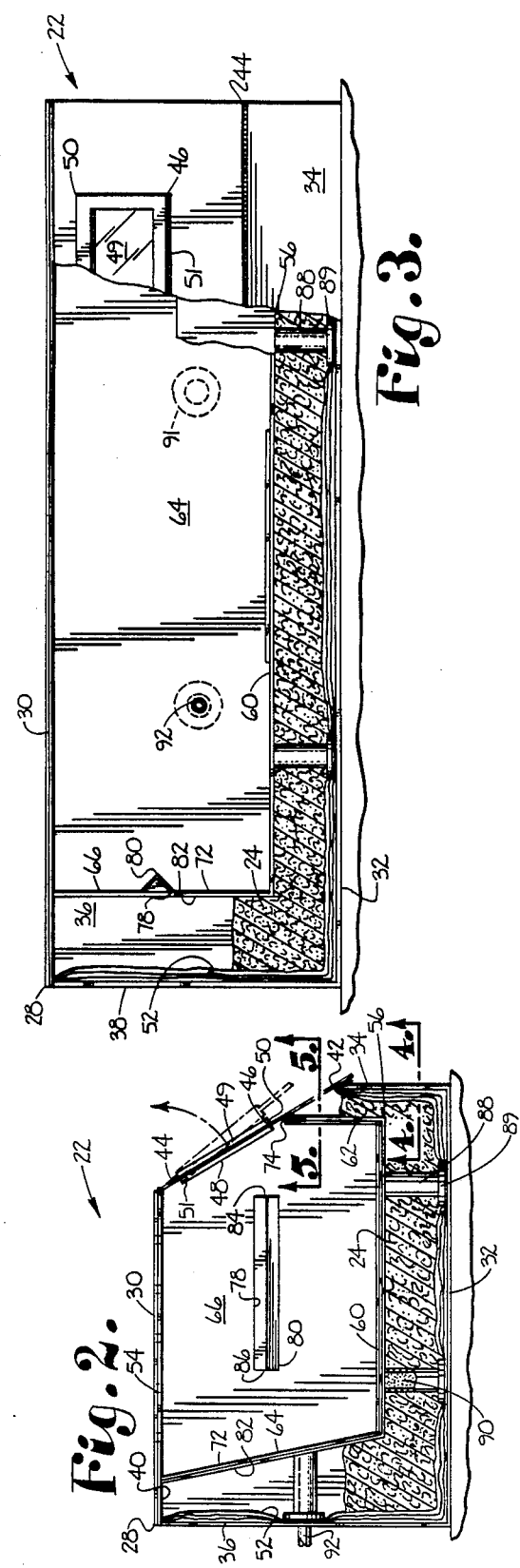

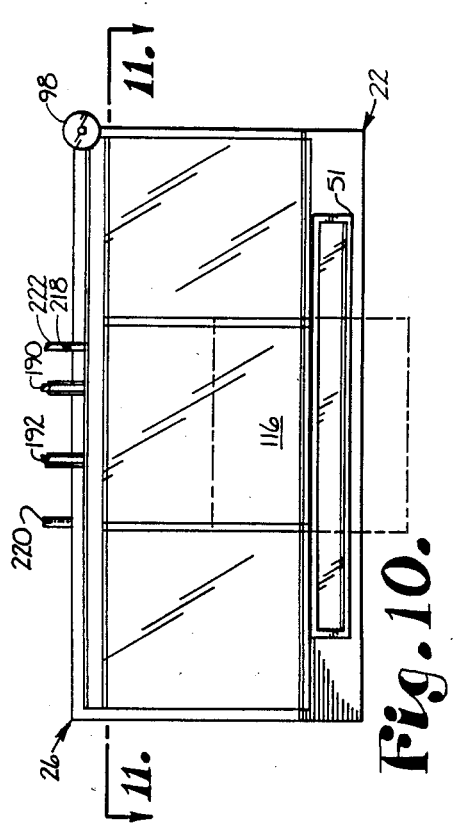
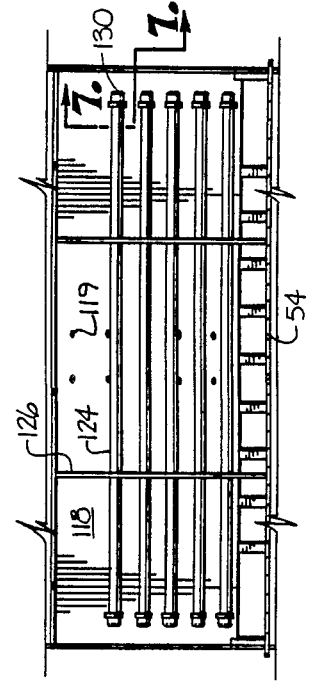
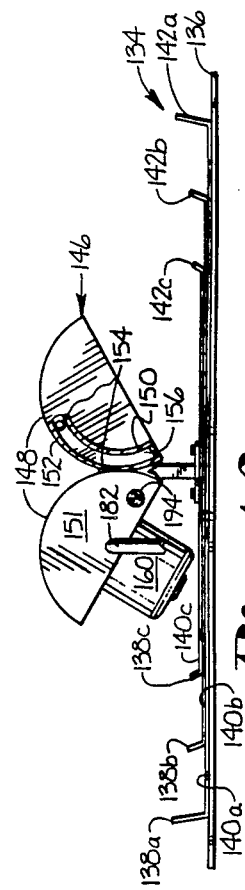
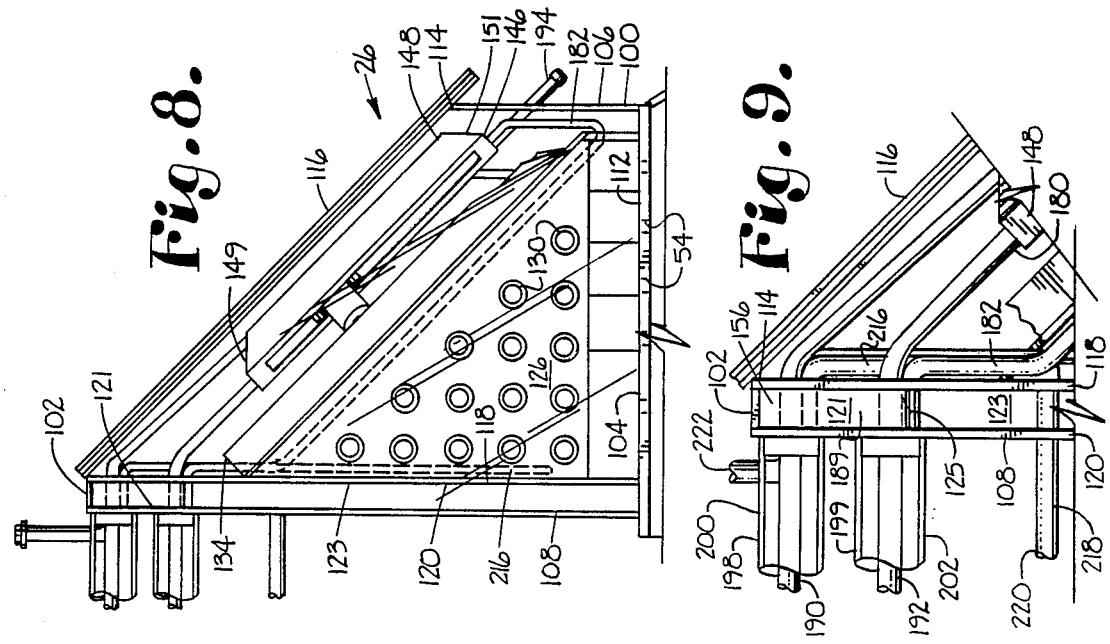

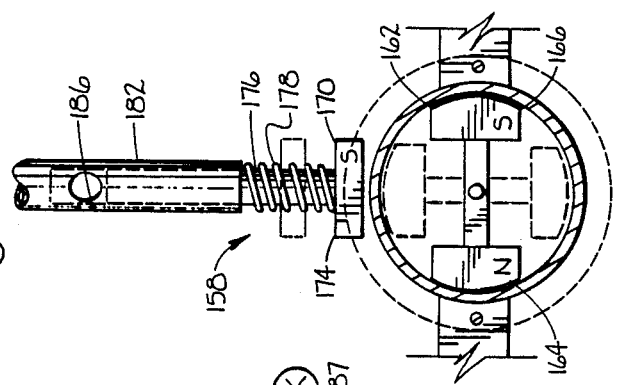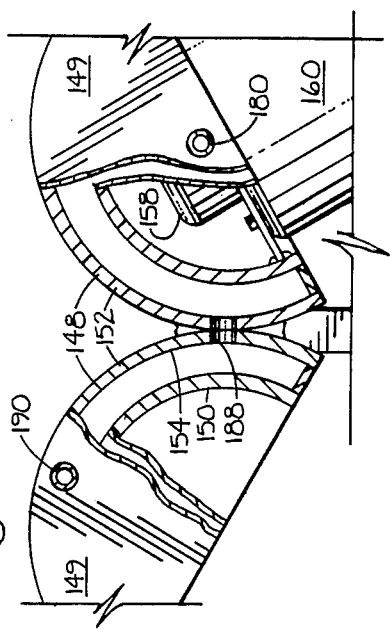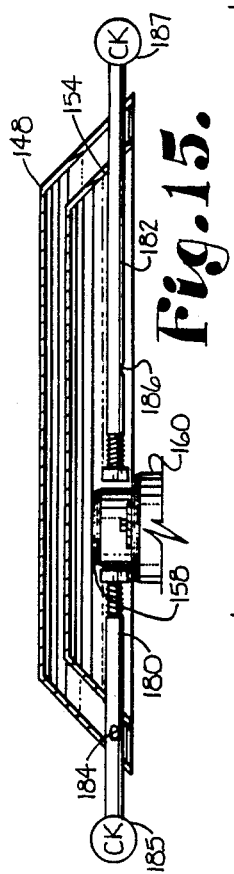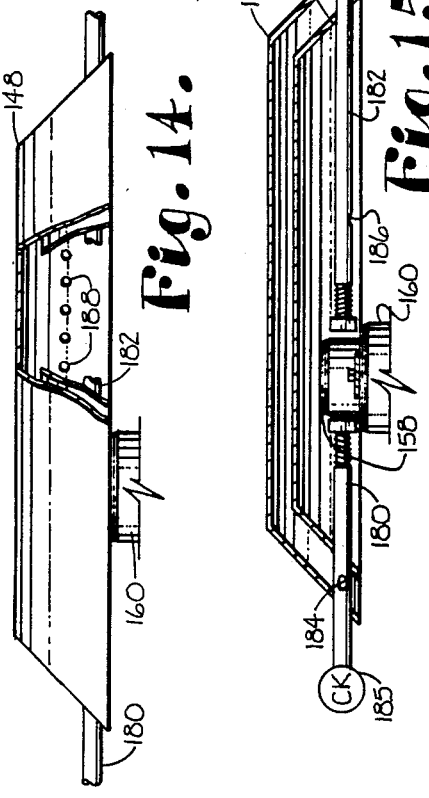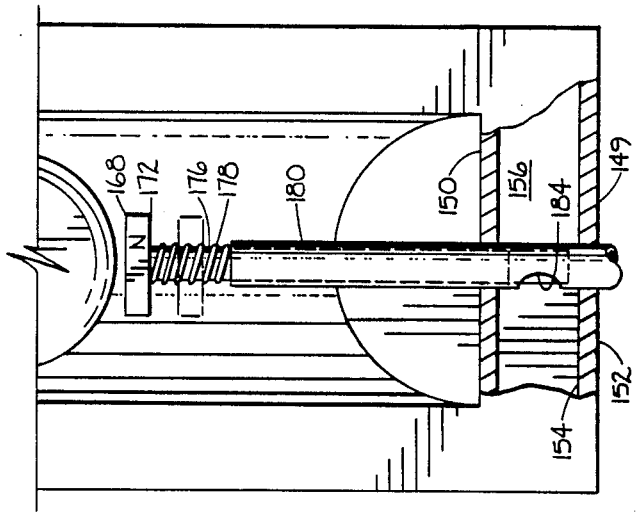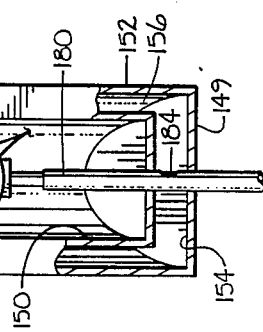

SOLAR ENERGY SYSTEM

BACKGROUND OF THE INVENTION

1. Field of the Invention

The present invention relates generally to solar energy devices and in particular to a solar energy system adapted to function as a source of both heated air and heated water.

2. Description of the Prior Art

Solar energy provides numerous advantages over fossil fuel energy, including environmental advantages, ubiquitous availability, inexhaustability and cost. Although the solar insolation itself is available without cost, the equipment necessary to convert solar energy to usable energy forms can be relatively expensive. In fact, many previous solar energy systems were not economically feasable due to their relatively high costs of manufacture, operation, maintenance, etc. Hence, the enormous potential of solar energy for a wide variety of energy applications has scarcely been tapped.

Heretofore there has not been available a solar energy system with the advantages and features of the present invention.

SUMMARY OF THE INVENTION

In the practice of the present invention, a solar energy system is provided which includes lower and upper collectors. The lower collector includes inner and outer cabinets with an interstitial space therebetween. The interstitial space is adapted to receive compost for heat generation by a process of decomposition, thermal storage mass and insulation. The interiors of both the inner and outer cabinets receive solar insolation through openings covered with a transparent panel. The upper collector includes a vessel with a water compartment mounted over a reflector assembly for reflecting solar insolation to the vessel. Thermal storage is provided in the upper collector by means of water, air and sand. Water and air can be pumped into and out of the solar energy system. Heated air from the lower collector can be drawn or pumped into the upper collector for increasing the heat output of the latter.

OBJECTS AND ADVANTAGES OF THE PREFERRED EMBODIMENTS

The principal objects and advantages of the present invention include: providing a solar energy system: providing a solar energy system which effectively utilizes solar energy; providing a solar energy system which is adapted for heating both air and water; providing a solar energy system which generates supplemental heat through compost decomposition; providing a solar energy system which includes thermal mass storage; providing a solar energy system which effectively captures solar insolation through a wide variety of solar azimuth and elevation angles; providing a solar energy system which provides a relative balanced level of heat output; providing a solar energy system which includes fluid conduits for introducing convection flow air drafts into and out of a structure; providing a solar energy system which includes a pump for forcing both liquid and water through the solar energy system; and providing a solar energy system which is efficient in operation, relatively inexpensive to manufacture, capable of a long operating life and particularly well adapted for its proposed applications.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a top, front, right side perspective view of a solar energy system embodying the present invention.

FIG. 2 is a fragmentary, vertical, cross-sectional view of the solar energy system, particularly showing a lower collector thereof.

FIG. 3 is an enlarged, fragmentary, front elevational view of the lower collector, with portions broken away to reveal internal constructions.

FIG. 4 is an enlarged, fragmentary, vertical, cross-sectional view of the lower collector assembly, particularly showing the construction of an outer cabinet panel.

FIG. 5 is an enlarged, fragmentary, vertical, cross-sectional view of the lower collector, particularly showing the construction of an inner cabinet panel thereof.

FIG. 6 is an enlarged, side elevational view of an inlet tube of the lower collector.

FIG. 7 is an enlarged, fragmentary, vertical, cross-sectional view of a spacer of the lower collector, taken generally along line 7—7 in FIG. 11.

FIG. 8 is an enlarged, fragmentary, vertical, cross-sectional view of an upper collector of the solar energy system.

FIG. 9 is an enlarged, fragmentary, vertical, cross-sectional view of the upper collector, particularly showing fluid conduits thereof.

FIG. 10 is a top plan view of the solar energy system.

FIG. 11 is an enlarged, fragmentary, vertical, cross-sectional view of the upper collector.

FIG. 12 is an enlarged, fragmentary, front elevational view of a vessel assembly and a reflector assembly of the upper collector.

FIG. 13 is an enlarged, fragmentary, rear elevational view of the vessel assembly of the upper collector.

FIG. 14 is an enlarged, side elevational view of the vessel assembly with portions broken away to reveal internal constructions.

FIG. 15 is an enlarged, fragmentary, vertical, cross-sectional view of the vessel assembly.

FIG. 16 is an enlarged, fragmentary, rear elevational view of the vessel assembly, particularly showing a pump assembly thereof.

FIG. 17 is an enlarged, fragmentary, rear elevational view of the vessel assembly, particularly showing a portion of the pump assembly.

FIG. 18 is an enlarged, fragmentary, front elevational view of the vessel assembly with portions broken away to reveal internal construction.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed Certain terminology will be used in the following description for convenience and reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the structure being referred to. Said terminology will include the words specifically mentioned, derivatives thereof and words of similar import.

The reference numeral 20 generally designates a solar energy system embodying the present invention. The solar energy system 20 generally comprises a lower collector 22 which can be adapted for heating air and which can contain a quantity of an organic material which produces heat through a process of decay and decomposition, such as compost 24; and an upper collector 26 adapted for heating both air and a liquid material such as water. The lower and upper collectors 22, 26 are designed for cooperative use together or for independent use in applications that are adapted to advantageously employ the operating characteristics of each.

II. Lower Collector 22

The lower solar collector 22 includes an outer cabinet 28 with top, bottom, front, back and opposite side panels 30, 32, 34, 36 and 38 which can comprise, for example, sheet metal such as stainless steel with a thickness of approximately one-eighth inch. The panels 30, 32, 34, 36 and 38 enclose an outer cabinet interior 40.

The outer cabinet 28 includes an opening 42 to its interior 40, which opening 42 slopes rearwardly and upwardly from the front panel 34 and extends between the opposite side panels 38. A cover 44 is hingedly connected to the top panel 30 adjacent to the opening 42 and is swingable between a lowered, closed position over the opening 42 and an open position (FIG. 2). The cover 44 includes a window opening 40 which is closed by inner and outer transparent panes 48, 49 within a frame 50 forming a double-pane window unit 51.

A liner 52 is placed in the outer cabinet interior 40 against the inside faces of its bottom, front and back panels 32, 34 and 36. The liner 52 may comprise, for example, three layers of a suitable polymeric material, such as polyvinyl, which fit together relatively loosely. In addition or as an alternative to the plastic layers of the liner 52, layers of insulation could be provided. The top panel 30 includes multiple vent openings 54.

An inner cabinet 56 is mounted in the outer cabinet interior 40 and includes bottom, front, back and opposite side panels 60, 62, 64 and 66, each of which can comprise, for example, a one-eighth inch thick layer of sheet metal steel 68 with a thin aluminum sheet metal inner layer 70 painted flat black and enclosing an inner cabinet interior 72 with the outer cabinet top panel 30. An inner cabinet opening 74 is formed between the inner cabinet front panel 62, its side panels 66 and the outer cabinet top panel 30. The inner cabinet opening 74 is positioned in generally coplanar relationship with the outer cabinet opening 42. The inner cabinet opening 74 can be selectively covered by the cover 44, which can also selectively cover the outer cabinet opening 42. The cabinet openings 42, 74 and/or the cover 44 can be provided with suitable gaskets and weather stripping for relatively tight sealing engagement with the cover 44 in its closed position.

Each inner cabinet side panel 66 includes a generally horizontal slot 78, which extends generally from front-to-back and is covered by a prism 80 mounted within the inner cabinet 56 for communicating solar radiation from an interstitial space 82 to the interior 72. Each prism 80 includes front and back ends 84, 86, which are painted or coated with an opaque, nonreflective material, e.g. flat black paint.

The inner cabinet 56 is supported within the outer cabinet interior 40 by a plurality (e.g. four) of hollow legs 88, which can be filled with sand 90. The legs 88 are welded to the inner cabinet bottom panel 60 and to respective disc-shaped feet 89 with smooth-rounded edges to avoid piercing the liner 52 upon which they rest. An inlet air conduit 92 extends through the outer cabinet back panel 36 and fluidically communicates with the inner cabinet interior 72. A spacer 91 extends between the cabinet back panels 36, 64. A safety vent line 96 extends from the lower collector 22 to a safety vent valve 98 and is adapted to release pressure in the event of an excessive build-up within the lower collector 22.

III. Upper Collector 26

The upper collector 26 includes a housing 100 with top, bottom, front, back and opposite side panels 102, 104, 106, 108 and 110 enclosing an interior 112. The interior 112 is open at a top opening 114 which slants upwardly and rearwardly from the front panel 106 to the top panel 102 and between the opposite side panels 110. The opening 114 can be covered by a double-thickness or insulating glass pane 116. Within the interior 112 a false back wall 118 is mounted in parallel, spaced relation with respect to the back panel 108 and forms a fluid reservoir 120 therewith. The fluid reservoir 120 includes an upper, water compartment 121 and a lower, air compartment 123 separated by a compartment divider wall 125. The false back wall 118 includes multiple orifices 119 for exchanging fluid between the lower, air compartment 123 and the rest of the interior 112.

A thermal mass storage assembly 122 is provided in the housing interior 112 in proximity to the bottom panel 104 and the false back wall 118. The thermal mass storage assembly 122 includes a plurality of transversely-extending pipes or hollow tubes 124 mounted on and extending through a pair of thermal mass storage assembly support walls 126 with generally triangular configurations. A granular, heat-retaining material, such as sand 128 is provided in the pipes or tubes 124, and is retained therein by caps 130 on the pipe or tube ends.

A reflector assembly 134 is mounted within the interior 112 between the thermal mass storage assembly 122 and the pane 116, and extends generally between the front panel 106 and the false back wall 118 at an appropriate sloping angle, which can substantially parallel the slope of the pane 116. The reflector assembly 134 includes a base plate 136 which can be mounted to the tops of the triangular support walls 126 and outer, intermediate and inner reflector plates 138a, 138b and 138c each including a respective base section 140a–140c and opposite, upwardly folded end sections 142a–142c.

The outer plate end sections 142a are sloped outwardly with respect to vertical at angles of approximately ten degrees. The intermediate and inner reflector plate end sections 142b, 142c are sloped outwardly with respect to vertical at angles of approximately twenty degrees and thirty degrees respectively. The reflector plates 138a–138c can be formed of a suitable reflective material, such as polished metal. The reflector plates 138a–138c can be painted flat black on their back sides to increase heat absorbency.

A collector vessel assembly 146 is mounted within the interior 112 between reflector assembly 134 and the pane 116. The collector vessel assembly 146 includes a juxtaposed pair of vessels 148 each having outwardly-convex inner and outer walls 150, 152 with generally semi-cylindrical configurations and generally semi-circular cross-sectional configurations (FIG. 12). Between its inner and outer walls 150, 152, each vessel 148 forms a volume 154 adapted to contain a fluid, such as water 156. Each vessel 148 includes upper and lower ends 149, 151 which are tapered and thus slope with respect to the orientation of the vessels 148.

A pump 158 is placed below one of the vessels 148 and includes an electric motor 160 mounting a rotor 162 with diametrically and magnetically opposed magnets 164, 166. A pair of plungers 168, 170 interact with the magnets 164, 166 and each includes a respective magnet 172, 174 mounted on a shaft 176 receiving a spring 178. The shafts 176 are received in fluid (e.g. water and air) conduits 180, 182 with orifices 184, 186 communicating with the vessel enclosed volume 154 and the interior 112 respectively. One-way check valves 185, 187 are provided in the conduits 180, 182 respectively. Thus, a pump is provided for pumping liquid into and out of the vessels 148, and pumps are provided for pumping air through the conduits 182. Various types of pumps would operate suitably with the solar energy system of the present invention. For example, such pumps could comprise electromagnets, solenoids, etc.

The vessels 148 fluidically communicate with each other through cross-flow passages 188. In an exemplary operational configuration, water 156 enters the collector vessel assembly 146 through an inlet conduit 190 and exits through an outlet conduit 192 which communicates with the fluid conduit 180. A discharge or drain conduit 194 is provided on one of the vessels 148 at a lower end 151 thereof.

The air conduit 182 extends from the pump 158 below the vessel lower end 151, under the reflector assembly 134, through the false back wall 118, through the back panel 108 and out of the upper collector 26. The water inlet and outlet conduits 190, 192 extend through air inlet and outlet sleeves 198, 199 which communicate with the housing interior 112 for air exchange with an adjacent structure or the like. Each sleeve 198, 199 includes a transparent top half 200 and a bottom half 202 painted flat black. The inlet sleeve 198 pneumatically communicates with an air inlet tube 216 and the outlet sleeve 199 pneumatically communicates with the air conduit 182 from the pump 158. A vent tube line 218 extends from an inlet 220 (e.g. open to the interior of an adjacent structure, through the back panel 108, through the false back wall 118, through an upper portion of the interior 112, back through the false back wall 118 and out through the back panel 108 to a discharge end 222 which can selectively receive a cap 224. The vent tube can create an air draft by convection due to the heating of that portion of the vent tube 218 within the collector interior 112.

IV. Operation

In operation, the lower and upper collectors 26 cooperate with each other to heat both air and water through solar energy and also through the decomposition of compost 24 within the interstitial space 82. Solar radiation enters the lower collector 22 through the pane 48 and generally warms the interior 40. The air within the inner cabinet 56 is warmed by solar radiation entering through its transparent pane 76 and by solar radiation entering through the prisms 80. The inner cabinet 56 is generally hermetically sealed from the interstitial space 82 and the outside atmosphere. The entire inner cabinet 56 is further warmed by the decomposition of the compost material 24, which also provides insulation and thermal storage mass.

The lower and upper collectors 22, 26 can be used independently of each other for heating fluids, i.e. air and water, for various applications, including space heating within a structure. By combining the collectors 22, 26, significant advantages can be achieved in the overall operating effeciency of the solar energy system 20. In such a system, the lower collector 22 functions as thermal mass storage and provides warm air to the upper collector 26, even when there is no solar insolation input to the system. Heated air exchange with the inner cabinet 56 is provided through the air inlet conduit 92, for example with an adjacent structure, and through the vent openings 94 with the upper collector 26. Within the upper collector 26 both the fluid reservoir 120 and the thermal mass storage assembly 122 are adapted to passively store thermal energy and thus tend to level the heat output of the upper collector 26.

The vessel assembly 146 is irradiated by solar energy in the form of insolation, including reflected solar energy from the reflector assembly 134. The vessel assembly 146 with its pair of juxtaposed vessels 148 can receive solar insolation with the sun positioned at various orientations through wide ranges of azimuth and elevation angles. Water 156 is warmed therein for pumping outside of the upper collector 26 or for pumping to the fluid reservoir 120. The movement of air through the interior 112, for example by the action of the pumps 158, tends to remove the excess heat from their motors 160 and from the magnets 164, 166, which heat is transferred with the outlet air to a structure or generally distributed to warm the interior 112.

It is to be understood that while certain forms of the present invention have been illustrated and described herein, it is not to be limited to the specific forms or arrangement of parts described and shown.

What is claimed and desired to be secured by Letters Patent is as follows:

1. A solar energy system, which includes:
   (a) a lower solar energy collector comprising:
      (1) an outer cabinet including a top, bottom, a front, a back and opposite sides;
      (2) said outer cabinet including an opening;
      (3) said outer cabinet forming an enclosed interior;
      (4) an inner cabinet including a top, a bottom, a front, a back and opposite sides;
      (5) said inner cabinet including an opening;
      (6) said inner cabinet forming an inner cabinet interior;

(7) inner cabinet mounting means mounting said inner cabinet in spaced relation from said outer cabinet within said outer cabinet interior whereby an interstitial space is formed between said inner and outer cabinets;

(8) an inlet fluid conduit extending through said outer cabinet and fluidically communicating with said inner cabinet interior;

(9) a fluid outlet conduit extending through said outer cabinet and fluidically communicating with said inner cabinet interior; and

(10) transparent panel means adapted to cover said cabinet openings;

(b) an upper collector including:

(1) a housing with a top, a bottom, a front, a back and opposite sides;

(2) said housing having an opening and a transparent panel covering said opening;

(3) said housing forming an enclosed interior;

(4) a fluid vessel positioned within said interior in proximity to said opening;

(5) vessel mounting means mounting said vessel within said housing interior in proximity to said housing opening;

(6) a fluid inlet conduit extending through said housing and fluidically communicating with said vessel;

(7) a fluid outlet conduit extending through said housing and fluidically communicating with said vessel; and (8) thermal energy storage means positioned within said housing interior; and (c) interconnector fluid conduit means fluidically communicating said inner cabinet interior with said housing interior.

2. The solar energy system according to claim 1, which includes:

(a) compost in said interstitial space.

3. The solar energy system according to claim 1, which includes:

(a) said fluid in said lower solar energy collector comprising gas.

4. The solar energy system according to claim 1 wherein:

(a) said inner cabinet includes a pair of side openings and a pair of prisms each covering a respective side opening and communicating light from said interstitial space to said inner cabinet interior.

5. The solar energy system according to claim 1 wherein:

(a) said outer cabinet includes a sloping panel hingedly mounted on said top and extending between said outer cabinet top and front, said sloping panel including said outer cabinet opening.

6. The solar energy system according to claim 1, which includes:

(a) a reflector assembly mounted within said upper collector interior between said vessel and said thermal energy storage means.

7. The solar energy system according to claim 1 wherein:

(a) said vessel comprises a pair of juxtaposed containers.

8. The solar energy system according to claim 7 wherein:

(a) each said container includes a fluid-containing compartment with an outwardly-convex cross-sectional configuration.

9. The solar energy system according to claim 7 wherein:

(a) each said container has a generally semi-cylindrical configuration.

10. The solar energy system according to claim 7 wherein:

(a) each said container includes a pump fluidically communicating with said inlet and outlet conduits and adapted for pumping fluid through said container.

11. The solar energy system according to claim 1 wherein:

(a) said thermal energy storage means comprises a plurality of transversly-extending pipes and a granular material contained within said pipes.

12. The solar energy system according to claim 1 wherein:

(a) said thermal energy storage means comprises a fluid compartment positioned at the back of said upper collector housing.

* * * * *